UNITED STATES PATENT OFFICE.

EDWARD GOODRICH ACHESON, OF STAMFORD TOWNSHIP, WELLAND COUNTY, CANADA.

METHOD OF DEFLOCCULATING INSOLUBLE BODIES.

964,478. Specification of Letters Patent. Patented July 19, 1910.

No Drawing. Application filed December 10, 1909. Serial No. 532,469.

*To all whom it may concern:*

Be it known that I, EDWARD GOODRICH ACHESON, a citizen of the United States, residing in Stamford township, Welland county, Province of Ontario, Canada, have invented certain new and useful Improvements in Methods of Deflocculating Insoluble Bodies, of which the following is a specification.

This invention relates to the disintegration or deflocculation of insoluble bodies by the action thereon of modifying or deflocculating agents comprising tannin or bodies of similar effect, vegetable extracts, and in general such organic substances as are capable of exerting a deflocculating effect.

The present invention comprises an efficient and economical method of deflocculating insoluble bodies.

The invention also relates to an improved method of transferring deflocculated bodies to non-aqueous media and the preparation of non-aqueous mixtures, such as pastes or suspensions.

In my prior Patents Nos. 843,426, granted February 5, 1907, and 844,989, granted February 19, 1907, I have described a method of disintegrating or deflocculating amorphous bodies, consisting in moistening the powdered amorphous body with a solution of a deflocculating or modifying agent, and thoroughly working or macerating the resulting paste in a suitable mill, the resulting material being thereafter diluted with water and the liquid carrying the deflocculated and suspended particles decanted. In the course of this treatment a certain proportion or even all of the modifying agent may disappear from solution and become associated or fixed in or upon the particles of the amorphous body. The amorphous body is at the same time reduced to a state of minute subdivision and acquires the properties of being indefinitely or permanently suspensible in water and other liquids, and of passing when so suspended through the finest filter paper. In this state it is said to be deflocculated. I have now observed that the presence in solution of any considerable or excessive proportion of the deflocculating agent exerts a retarding effect upon the deflocculation, and that greatly improved results are obtained if the process be so conducted that the deflocculating agent is added at substantially the rate at which it is removed from solution or at such rate or intervals of time that there does not at any time exist in solution in presence of the mass undergoing deflocculation a harmful excess of the dissolved deflocculating agent. The addition of the deflocculating agent may be either continuous or intermittent, it being essential only that it be so regulated as to avoid the injurious or retarding action of a dissolved excess.

As an illustrative example of the present method, I will describe the deflocculation of graphite, the mode of operation being similar as applied to other insoluble and unfused or amorphous bodies of the general class referred to in my prior patents, as for example lampblack, siloxicon, alumina, amorphous carbid of silicon and the like. I prefer to proceed substantially as follows, it being understood that the procedure may be variously modified without departure from my invention. The graphite to be deflocculated, in a state of fine subdivision, is moistened with water in proportion to form a stiff paste. Preferably there is incorporated with the mass a suitable proportion of dextrin or equivalent material, the function of which, in part at least, is to facilitate the subdivision or disintegration of the graphite and to prevent coalescence of the constituent particles thereof, as described in my prior Patent No. 875,881, granted January 7, 1908. Such added material is usually colloidal, and should of course, in the proportion used, be incapable of a flocculating effect. Such addition of dextrin or equivalent substance is found to facilitate to a marked extent the absorption, fixation or association of the deflocculating agent by the graphite, and the deflocculation of the graphite, and is believed to confer increased stability upon the product. The dextrin may be added in the proportion of 20 to 30 per cent. or more of the weight of the graphite, being introduced thereinto in solution in the water used for preparation of the paste. The paste is then worked or macerated, preferably in mechanically operated mills, and the deflocculating agent added thereto in a regulated manner. One satisfactory procedure consists in preparing an aqueous solution of tannin or other modifying agent, to which ammonia can be added, or the tannin may be dissolved in a solution of ammonia: this solution is then added to the paste and frictionally incorporated therewith. The modifying agent may be added in relatively small proportions at suitable intervals, or it may be continuously supplied, care being taken in either case to so regulate the addition that no considerable or injurious excess of the deflocculating agent appears in solution. This may be readily determined by simple methods: for example a sample of the paste may be diluted with water and a drop of the resulting suspension applied to an absorbent paper, whereupon the water will spread rapidly carrying with it the deflocculated body; upon drying, an excess of deflocculating agent will be shown by a pronounced discoloration around the outer margin of the spot thus produced. The presence of a slight excess of dissolved deflocculating agent is probably essential for continued action, but the presence of a greater excess exerts as above pointed out a retarding effect on the process. It is also observed that the dextrin tends to disappear from solution and to become associated with the graphite, and it is advisable to make such additions of dextrin, either at or before the beginning of the operation or continuously or from time to time during its progress, as will result in the presence in the diluted paste of a certain proportion of this substance in a dissolved state. The working of the paste, with the regulated addition of the modifying agent, is continued so long as the modifying agent is rapidly absorbed or abstracted from solution, or until a sufficient proportion of the graphite or other amorphous body has become deflocculated. This operation may be continued for several days or weeks. The paste is then stirred into a sufficient volume of water to suspend the deflocculated particles while permitting the undeflocculated residue to settle. The liquid carrying the deflocculated material is decanted and further treated in accordance with the purpose to which the material is to be applied.

For the preparation of a paste containing the deflocculated material and water, the excess of water may be separated by filtration through colloidal filtering media as described in my prior Patent No. 895,063, granted August 4, 1908; or the excess of liquid may be expelled by evaporation at normal or higher temperatures, and preferably *in vacuo*. The paste thus prepared may be preserved or transported in air-tight packages, and is adapted by simple admixture with water for the preparation of a highly efficient lubricant.

In case it is desired to transfer the deflocculated material to oils or other non-aqueous media, this may be accomplished by displacing the water from the paste by means of oil as described in my prior Patent No. 911,358, granted February 2, 1909; or the paste may be dehydrated by treatment in suspension in oil at temperatures sufficient to expel the water as described in my co-pending application, Ser. No. 514,553, filed August 25, 1909. Or highly satisfactory results may be obtained by a combination of these processes, the aqueous paste being first worked with oil or other non-aqueous media to displace water, and the resulting product being then suspended in oil or other suitable non-aqueous media and fully dehydrated therein as described in the above mentioned application.

It is characteristic of the material prepared in accordance with the present disclosure that it is not highly sensitive to the presence of electrolytes, such as mineral acids or salts, and is not quickly flocculated thereby even at boiling temperatures, although it may be ultimately precipitated. It is further characteristic of the material that after being substantially or completely dehydrated under proper conditions and without exposure to excessive temperatures, it is capable of prolonged or indefinite suspension not only in neutral oils, but in crude oils and in such refined oils as contain residual acid or alkali. For example, the properly prepared material, dehydrated as above described, is found capable of suspension for weeks or months, and for undetermined periods, in ordinary kerosene.

I claim:

1. The method of deflocculating insoluble bodies, which consists in progressively adding a deflocculating agent as the deflocculation proceeds.

2. The method of deflocculating insoluble bodies, which consists in progressively adding a deflocculating agent as the deflocculation proceeds and frictionally incorporating said agent with the mass undergoing deflocculation.

3. The method of deflocculating insoluble bodies, which consists in acting thereon with a deflocculating agent in presence of a soluble substance capable of accelerating the deflocculation.

4. The method of deflocculating insoluble bodies, which consists in acting thereon with a deflocculating agent in presence of a soluble colloid capable of accelerating the deflocculation.

5. The method of deflocculating insoluble bodies, which consists in acting thereon with a deflocculating agent in presence of dextrin.

6. The method of deflocculating insoluble bodies, which consists in incorporating a soluble substance therewith, and progressively adding a deflocculating agent as the deflocculation proceeds.

7. The method of deflocculating insoluble bodies which consists in incorporating a soluble substance therewith, progressively adding a deflocculating agent as the deflocculation proceeds, and frictionally incorporating said agent with the mass undergoing deflocculation.

8. The method of deflocculating insoluble bodies and preparing non-aqueous mixtures thereof, which consists in deflocculating said bodies in presence of water while progressively adding the deflocculating agent, and then replacing the water by a non-aqueous medium.

9. The method of deflocculating insoluble bodies and preparing non-aqueous mixtures thereof, which consists in deflocculating said bodies in presence of water while progressively adding the deflocculating agent, frictionally incorporating said agent with the mass undergoing deflocculation, separating the deflocculated material from any undeflocculated residue, eliminating a portion of the water, and replacing the residual water by a non-aqueous medium.

10. The method of deflocculating graphite and preparing mixtures thereof with oil, which consists in deflocculating the graphite in presence of water while progressively adding the deflocculating agent, and then replacing the water by oil.

11. The method of deflocculating graphite and preparing mixtures thereof with oil, which consists in deflocculating the graphite in presence of water while progressively adding the deflocculating agent, frictionally incorporating said agent with the mass undergoing deflocculation, separating the deflocculated material from the undeflocculated residue, eliminating a portion of the water, and replacing the residual water by oil.

In testimony whereof, I affix my signature in presence of two witnesses.

EDWARD GOODRICH ACHESON.

Witnesses:
  JOHN P. DERINGER,
  RALPH B. CLARKE.